United States Patent
Iyer et al.

(10) Patent No.: US 8,315,241 B2
(45) Date of Patent: Nov. 20, 2012

(54) METHOD AND APPARATUS FOR PROVIDING QUALITY OF SERVICE IN WIRELESS NETWORKS AND SENSOR NETWORKS

(75) Inventors: Suresh K. Iyer, Germantown, MD (US); Scott Charles Evans, Burnt Hills, NY (US); Harold Woodruff Tomlinson, Jr., Ballston Spa, NY (US); Budhaditya Deb, Niskayuna, NY (US); Giri Kuthethoor, Boyds, MD (US); Ishan P. Weerakoon, Rockville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 991 days.

(21) Appl. No.: 12/059,121

(22) Filed: Mar. 31, 2008

(65) Prior Publication Data
US 2009/0245224 A1  Oct. 1, 2009

(51) Int. Cl.
*H04J 3/00* (2006.01)
(52) U.S. Cl. .................................................. 370/345
(58) Field of Classification Search .................. None
See application file for complete search history.

(56) References Cited

U.S. PATENT DOCUMENTS

| | | | |
|---|---|---|---|
| 6,327,254 B1 * | 12/2001 | Chuah | 370/328 |
| 6,542,490 B1 * | 4/2003 | Ahmadvand et al. | 370/338 |
| 7,170,877 B2 * | 1/2007 | Livet et al. | 370/337 |
| 7,545,745 B1 * | 6/2009 | Cherchali et al. | 370/232 |
| 7,873,047 B2 * | 1/2011 | Chui | 370/392 |
| 2002/0159411 A1 * | 10/2002 | Airy et al. | 370/330 |
| 2003/0133457 A1 * | 7/2003 | Ono et al. | 370/395.4 |
| 2007/0064604 A1 * | 3/2007 | Chen et al. | 370/230 |
| 2007/0263591 A1 * | 11/2007 | Diachina et al. | 370/351 |

OTHER PUBLICATIONS

Van Stralen, et al. "A Multi-Band Random Access Messaging Protocol", Lockheed Martin Integrated Systems Solutions, 6 pages, 2006 IEEE conference on Military communications, ISB 1-4244-0618-8.

* cited by examiner

*Primary Examiner* — Chi Pham
*Assistant Examiner* — Kouroush Mohebbi
(74) *Attorney, Agent, or Firm* — Ronald E. Prass, Jr.; Prass LLP

(57) ABSTRACT

A method and apparatus that provides quality of service in wireless or sensor networks is disclosed. The method may include determining a class of service for transmission of one or more messages, adjusting a maximum packet length based on the determined class of service, allocating message time slots based on the determined class of service, setting a guard band size and frequency of resynchronization, and transmitting one or more messages using the adjusted maximum packet length, the allocated message time slots, and the set guard band size and frequency of resynchronization.

17 Claims, 3 Drawing Sheets

METHOD AND APPARATUS FOR PROVIDING QUALITY OF SERVICE IN WIRELESS NETWORKS AND SENSOR NETWORKS

BACKGROUND OF THE DISCLOSURE

1. Field of the Disclosure

The disclosure relates to wireless telephone communications.

2. Introduction

Adequate Quality of Service, such as achieving maximum latency requirements, is critical to network traffic success, and different classes of traffic have different QoS needs. Real time traffic, such as voice or video for example, require End to End (E2E) delivery within maximum time intervals, while some traffic has less strict E2E requirements. When networks are congested it is important that higher priority traffic is allowed the use of network resources rather than lower priority traffic in a manner that achieves E2E success.

SUMMARY OF THE DISCLOSURE

A method and apparatus that provides quality of service in wireless or sensor networks is disclosed. The method may include determining a class of service for transmission of one or more messages, adjusting a maximum packet length based on the determined class of service, allocating message time slots based on the determined class of service, setting a guard band size and frequency of resynchronization, and transmitting one or more messages using the adjusted maximum packet length, the allocated message time slots, and the set guard band size and frequency of resynchronization.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
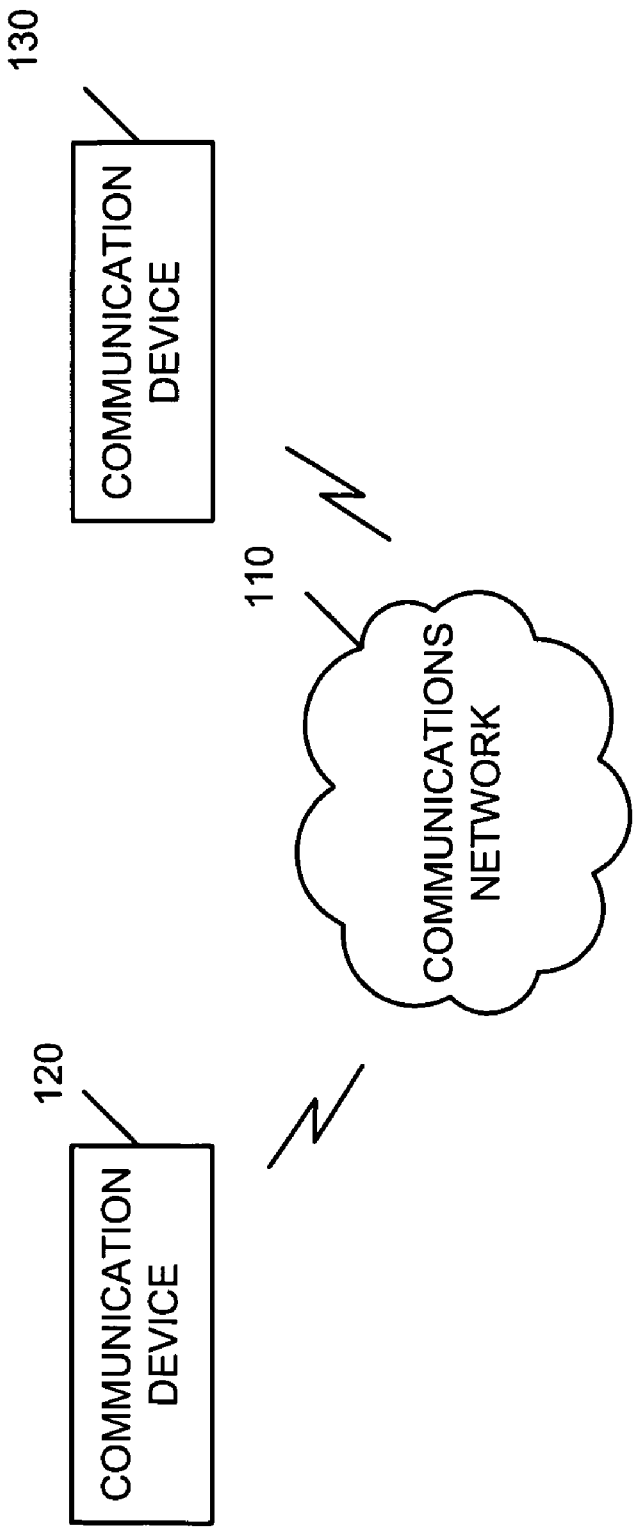
FIG. 1 illustrates an exemplary diagram of a communications network environment in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. This disclosure concerns a method and apparatus in which a plurality of nodes utilizing a Connectionless Scheduling Protocol (CSP) to move a plurality of traffic types or classes with different multi-hop Quality of Service (QoS) needs. CSP is a cross layer media access protocol that uses a pseudorandom message scheduling approach to achieve near optimal channel utilization with near optimal energy utilization, providing benefit for resource constrained multi-hop applications, such as wing stress monitoring. The QoS differentiation can be easily applied to this protocol by providing simple message length or schedule availability constraints. Theoretical analysis is conducted through a derived probabilistic model.

Scheduling protocols are preferred for media access in wireless sensor networks since they are inherently more energy efficient than random access protocols. Scheduled transmission protocols minimize energy by having nodes wake up and sleep at about the same time thus reducing the lost energy due to idle time. However, a problem arises concerning the provision for the schedules to each of these nodes and creation of duty cycles for relay nodes which are perpetually active in most scheduling protocols. In this manner, CSP not only produces near perfect channel utilization but also allows relay nodes to be duty cycled providing significant power reduction over full-function devices. CSP achieves these using Message Start Times (MSTs) based channel access, pseudo-random schedule of MSTs based on node ID or location, and the ability to allocate the pre-determined schedules as start times for message transmission or reception.

The disclosure discusses the use of the parameters configurable in CSP, namely Max Packet Length and number of MSTs, to provide QoS to classes of network traffic, priorities of traffic within classes, or priorities of users or nodes sending or receiving traffic. Higher priority users/classes or classes with more strict latency requirements may be given more MST schedules and longer maximum packet lengths, while lesser priority traffic may be given fewer MSTs. Variable message lengths are also employed based on policies that certain classes of traffic not preclude MSTs for higher priority classes of traffic.

In this way, CSP is augmented to provide class specific QoS for multiple classes and priorities of traffic and users. It is unique in that it addresses QoS with the CSP protocol, which provides new capabilities. CSP harnesses advantages in channel access and node sleep patterns through good network synchronization made possible by GPS, atomic clock, or other services/devices.

This disclosure discusses the extension of these advantages into the domain of QoS for mixed traffic types and priorities. Advantages may include maximizing network throughput for mixed classes of traffic and mixed priorities (traffic that achieves End-to-End (E2E) success) with a protocol capable of optimizing channel utilization and minimizing energy use.

Having CSP be designed such that it can provide service differentiation for different traffic classes, may achieve an energy efficient QoS protocol. It is important to note that while any media access protocol needs to provide a fair bandwidth distribution, QoS differentiation needs unequal distribution for different classes of packets. Specifically, different weights and priorities to MST, packet sizes and number of predetermined schedules would have to be provided to individual nodes which should provide the required service differentiation while still preserving the synchronized transmission mechanism and pseudo-randomness of CSP. The ability of CSP to accommodate network quality of service by controlling the above is discussed herein. Since clock synchronization becomes a big challenge with multiple classes, an analytical model of CSP throughput given clock synchronization accuracy and drift rate is discussed. We then expand this model to study the effect of both packet length and number of schedules on the performance of CSP for QoS differentiation.

FIG. 1 illustrates an exemplary diagram of a communications network environment 100 in accordance with a possible embodiment of the disclosure. The communications network environment 100 may include a plurality of wireless communication devices 120, 130 connected through a communications network 110.

Communications network 110 may represent any possible communications network that may handle telephonic communications, including wireless telephone networks, hardwired telephone networks, wireless local area networks (WLAN), the Internet, an intranet, etc., for example.

The communication device 120, 130 may represent any wireless communication device capable of telephonic communications, including a portable MP3 player, satellite radio receiver, AM/FM radio receiver, satellite television, portable music player, portable computer, wireless radio, wireless telephone, portable digital video recorder, cellular telephone, mobile telephone, personal digital assistant (PDA), etc., or combinations of the above, for example. Although only one wireless communication device 120 is shown this is merely illustrative. There may be any number of wireless communication devices 120, 130 in the communications network environment 100.

Figure 2:
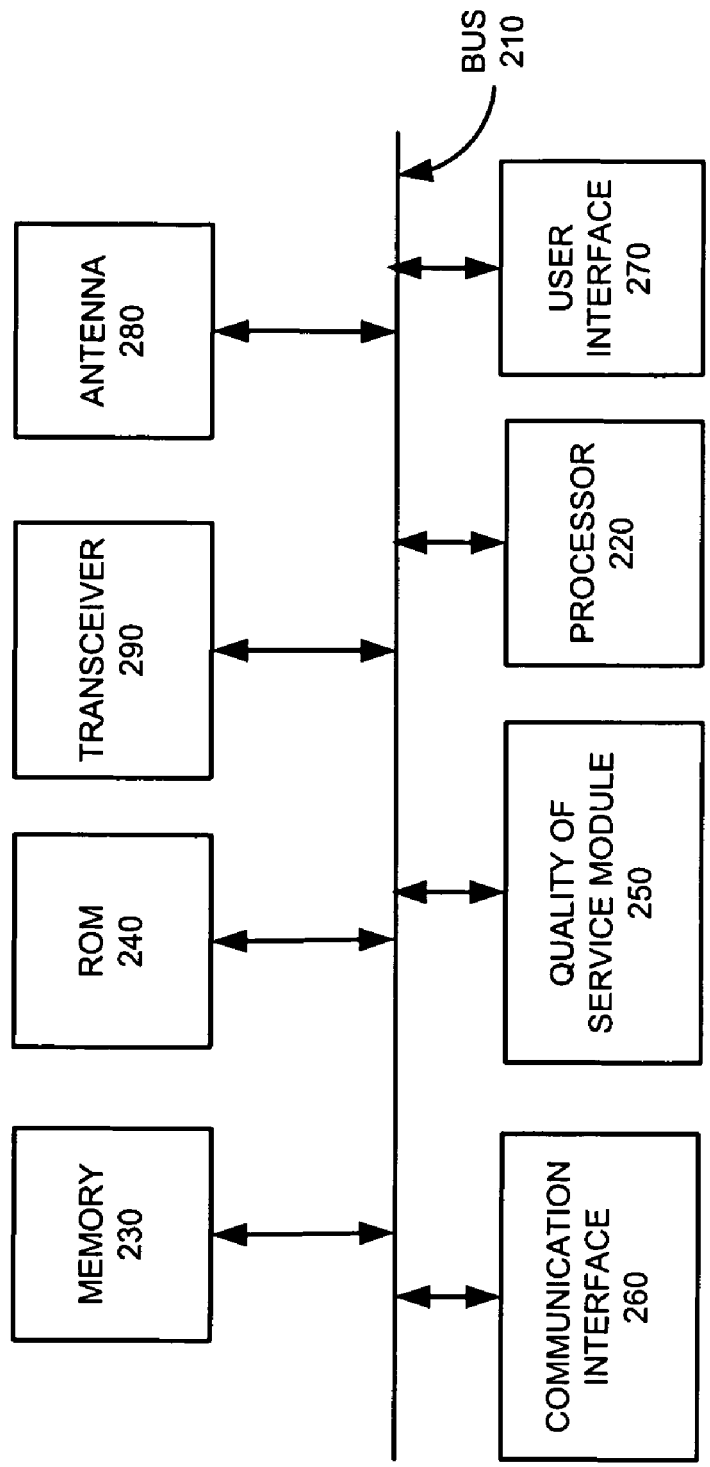
FIG. 2 illustrates a block diagram of an exemplary communication device in accordance with a possible embodiment of the disclosure.

FIG. 2 illustrates a block diagram of an exemplary communication device 120, 130 in accordance with a possible embodiment of the disclosure. The exemplary communication device 120, 130 may include a bus 210, a processor 220, a memory 230, a quality of service module 250, a communication interface 260, a user interface 270, an antenna 280, and a transceiver 290. Bus 210 may permit communication among the components of the communication device 120, 130.

Processor 220 may include at least one conventional processor or microprocessor that interprets and executes instructions. Memory 230 may be a random access memory (RAM) or another type of dynamic storage device that stores information and instructions for execution by processor 220. Read-only memory (ROM) 240 may include a conventional ROM device or another type of static storage device that stores static information and instructions for processor 220.

Transceiver 290 may include one or more transmitters and receivers. The transceiver 290 may include sufficient functionality to interface with any network or communications station and may be defined by hardware or software in any manner known to one of skill in the art. The processor 220 is cooperatively operable with the transceiver 290 to support operations within the communications network 110. In a wireless communication device 120, 130 the transceiver 290 may transmit and receive transmissions via one or more of the antennae 280 in a manner known to those of skill in the art.

Communication interface 260 may include any mechanism that facilitates communication via the communications network 110. For example, communication interface 260 may include a modem. Alternatively, communication interface 260 may include other mechanisms for assisting the transceiver 290 in communicating with other devices and/or systems via wireless or hardwired connections.

User interface 270 may include one or more conventional input mechanisms that permit a user to input information, communicate with the communication device 120, 130 and/or present information to the user, such as a an electronic display, microphone, touchpad, keypad, keyboard, mouse, pen, stylus, voice recognition device, buttons, one or more speakers, etc.

The communication device 120, 130 may perform such functions in response to processor 220 and/or quality of service module 250 by executing sequences of instructions contained in a computer-readable medium, such as, for example, memory 230. Such instructions may be read into memory 230 from another computer-readable medium, such as a storage device or from a separate device via communication interface 260.

The operations and functions of the quality of service module 250 and quality of service process will be discussed in relation to the flowchart in FIG. 3.in relation to the diagrams shown in FIGS. 1 and 2, above.

Figure 3:
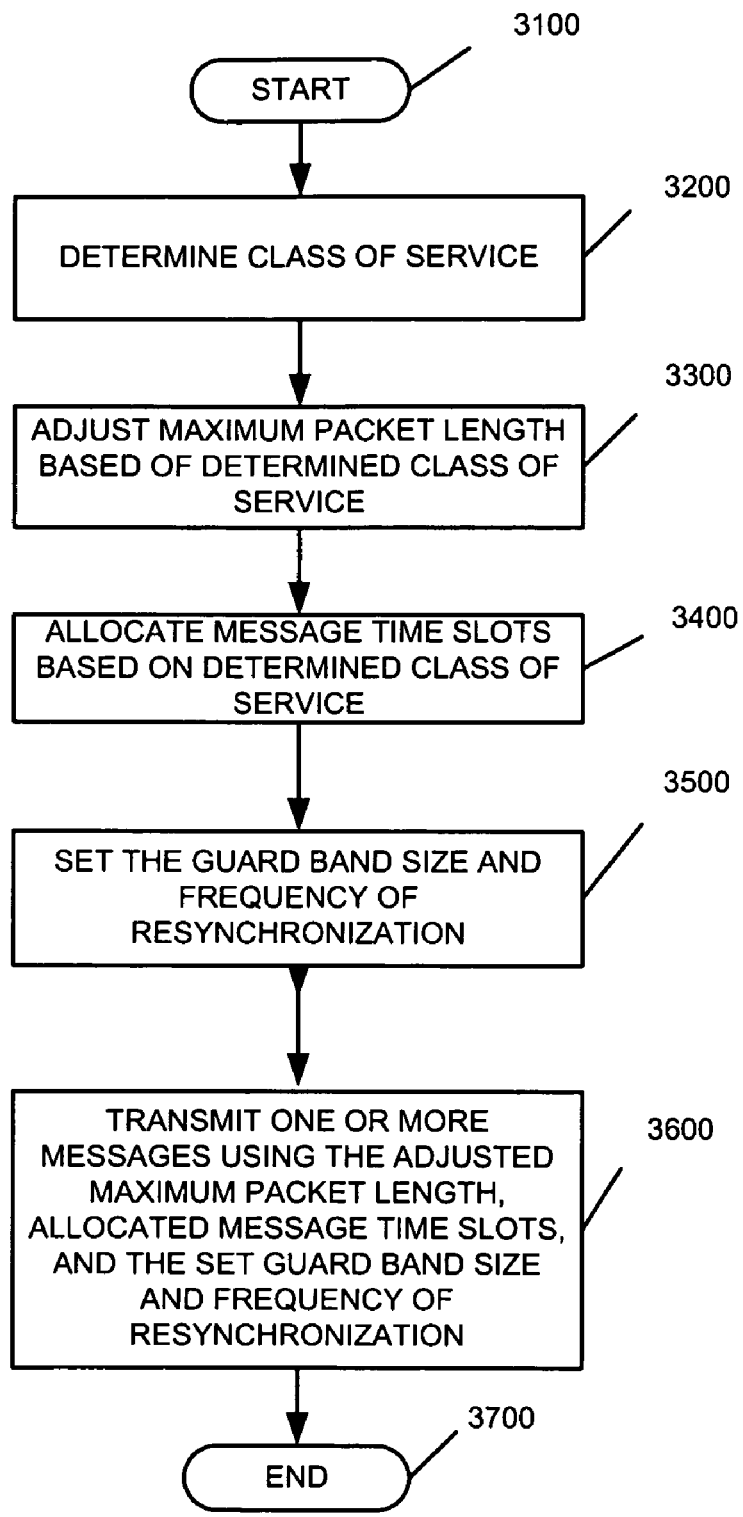
FIG. 3 illustrates is an exemplary flowchart illustrating one possible quality of service process in accordance with one possible embodiment of the disclosure.

FIG. 3 illustrates is an exemplary flowchart illustrating one possible quality of service process in accordance with one possible embodiment of the disclosure. The process begins at step 3100 and continues to step 3200 where the quality of service module 250 may determine the class of service for transmission of one or more messages.

At step 3300, the quality of service module 250 may adjust the maximum packet length based of the determined class of service. The quality of service module 250 may adjust the maximum packet length so that determined classes of service having a higher priority are given higher maximum packet lengths. Alternatively, the quality of service module may adjust the maximum packet length so that determined classes of service having a greater intended provision of bandwidth are given higher maximum packet lengths.

At step 3400, the quality of service module 250 may allocate message time slots based on the determined class of service. For example, the quality of service module 250 may allocate message time slots so that determined classes of service having a higher priority are given a higher number of time slots. At step 3500, the quality of service module 250 may set a guard band size and frequency of resynchronization. The guard band size and the frequency of resynchronization may be set based on one or more factors, including the determined class of service, and clock drift rate, for example. Note that steps 3300, 3400, and 3500 may be performed in any order.

At step 3600, the transceiver 290 transmits one or more messages using the adjusted maximum packet length, the allocated message time slots, and the set guard band size and frequency of resynchronization. The transceiver 290 may transmit the one or more messages from a communication device 120, 130, which may be one of a portable a satellite radio transceiver, a Voice over Internet Protocol (VoIP) phone, portable computer, wireless telephone, cellular telephone, mobile telephone, personal digital assistant (PDA), or a combination thereof. In this manner, the transceiver 290 may transmit the one or more messages from the communication device 120, 130 using a connectionless scheduling protocol. The process may then go to step 3700, and end.

Thus, in CSP each node (communication device 120, 130, for example) in the communications network environment 100 may get a pseudo-random schedule which is a set of MSTs which is unique to each node. For each MST, a node may get access to the channel for period equal to a predetermined packet transmission time which is the time taken to transmit the largest packet-size. For normal media access, both the number of MSTs or slots allocated to each node and the packet sizes may be the same for all the nodes. This arrangement may provide fair bandwidth distribution for the nodes.

The throughput of CSP may depend on clock accuracy. Due to clock errors, two consecutive transmissions may overlap creating collisions and hence loss of throughput. To prevent such an overlap, the guard band is inserted around each message start time. For QoS differentiation, the different MSTs/slots, packet sizes, and guard band times may behave differently for different traffic classes.

From the discussion above, there are primarily two methods for providing service differentiation using CSP, namely Slot Prioritization and Packet Prioritization:

With regard to slot prioritization, different classes of traffic are given different number of slots or MSTs per scheduling period. With larger number of slots, a class will get a greater share of the bandwidth and vice versa. All the traffic classes will have the same size of packets.

With regard to packet prioritization, different classes of traffic would have different packet sizes leading to different packet transmission times. The number of slots or MSTs may be assumed to be same for all the nodes.

Controlling only one of the two (i.e. number of slots or packet sizes) is realizable in practice. In theory, a combination of both of the above can be achieved which can be described mathematically as follows: Let, $T_P$=packet transmission time
$T_G$=guard band time.
c[1, . . . C]=The classes assigned to nodes
$N_c(i)$=Class to which node i belongs to
$N_C(c)$=Number of nodes in class C
$L_C(i)$=Packet size of node i belonging to class C
Slots(c)=Number of slots allocated per class Assuming that the smallest packet length captures 1 unit of the slot time (or packet transmission time $T_P$), the L(i) defines the number of slots the packet length will occupy for node i (i.e. L(i) is the defined in terms of number of unit slot times and is an integral multiple of $T_P$). The probability of node i to get a generic slot in the schedule may be given by:

$$P_{Slot}(i) = \frac{Slots(N_c(i))}{N_c \sum_{c=1}^{C} N_c(c)} \quad (1)$$

With ideal channel conditions, and perfect clock synchronization, the normalized throughput of node may be given by:

$$Throughput(i) = \frac{L_C(i)P_{Slot}(i)}{\sum_{i=1}^{N} L(i)P_{Slot}(i)} \quad (2)$$

Thus, equation 1 and 2 provide the framework for QoS differentiation using CSP. However, there are several factors which will affect the actual throughput, the most important of which is the problem of clock errors. Since scheduled transmissions rely on synchronized clocks and since introduction of multiple classes creates more randomness in the schedules, the problem with clock drift would have to be thoroughly investigated. For addressing this problem, rigorous mathematical model of CSP with multiple classes of traffic may be used.

For example, an analytical model of the CSP protocol to provide Quality of Service with multiple classes of traffic is discussed below. The model is used to understand the behavior of the protocol for various operating parameters and network conditions.

Equations 1 and 2 above give the throughput under ideal conditions. However, there are several factors on which the actual throughput depends. These are listed below.
1. Clock Initialization Error and Drift Errors
2. Scheduling with Multiple classes
3. Packet errors due to different packet sizes Each of these factors will be incorporated to derive the final throughput equation. All packet sizes and schedules per class may be the same for each of the nodes.

With regard to the effect of clock initialization and drift errors, when the clocks in different nodes are perfectly synchronized, the CSP protocol is more efficient than contention based protocols. CSP has the advantages of a Time Division Multiple Access (TDMA) based scheme and since the schedules are pseudorandom, it is more robust.

Even though the clocks are accurate, there may be errors in initialization. That is, each node has a clock which has some random error from the global clock. It is assumed that the initialization errors are normally distributed. In this case, a sequence of schedules is given by:

$$S_i = N(t_i, \sigma_{Initial}^2) = \text{Start Initialization Error} \quad (3)$$

Where the $t_i$ is the $i^{th}$ message start time. Since CSP is a pseudorandom sequence the $i^{th}$ MST may belong to any of the nodes. With a large number of nodes, the sequence can be approximated as independently distributed.

A message slot may be wasted when the difference between two consecutive MSTs is less than the packet transmission duration. To prevent overlapping schedules, CSP introduces a guard band, $T_G$ which is a constant idle time between two schedule.

The average time per schedule is given by:

$$T_{Slot}(avg) = \sum_{i=1}^{N} (L(i)T_p + T_G)P_{Slot}(i) \quad (4)$$

With $t_k$=k $T_{Slot}$(avg)=time for the $k^{th}$ schedule cycle

Since it is assumed that all the packet sizes and slots per class were the same for each of the nodes, the subscript associated with each class and node is dropped. Then, the Probability Distribution Function (PDF) of the inter-slot-time (IST) between two consecutive slots (assuming each has same packet sizes and slot probability) is given by:

$$P_{IST}(t_k) = N(t_{k+1}, \sigma_{Initial}^2) - N(t_k, \sigma_{initial}^2)$$

$$P_{IST}(t_k) = N(T_G + T_P, 2\sigma_{Initial}^2) \quad (5)$$

The probability that the $i^{th}$ slot is empty is given by:

$$P_{empty\_slot}(i, t_k) = \int_{x=t_k}^{x=t_{ki+1}-T_G} P_{IST}(t_k) \quad (6)$$

In reality clocks not only have synchronization errors but also have drift due to which they fall away from the global clock as time goes by. When we consider the distribution of clock errors as a function of time, the error at any given time is due to initialization errors and the clock drift errors. The cumulative standard deviation for the initialization errors with N nodes is simply $N\sigma_{Initial}^2$ Now for the clock drift, it is assumed it is linear in time, i.e.:

$$\sigma_{Drift}(t_k) = t_k \sigma_{Drift}(0) = \text{Clock Drift Error} \quad (7)$$

This error will accumulate over time. Since the initialization errors and drift errors have been assumed to be normal, the summation of the errors is also a normal distribution. Thus, the PDF of the $i^{th}$ start time with cumulative drift is given by:

$$P_{cumulative\_drift}(t_i) = N\left(t_{k+1}, N\sigma_{Initial}^2 + \frac{t_k^2}{2}\sigma_{Drift}(0)^2\right) \quad (8)$$

The probability distribution of the inter MST with the $(k+1)^{th}$ schedule being empty is given by:

$$P_{IST}(t_k + 1) = P_{cumulative\_drift}(t_{k+1}) - P_{cumulative\_drift}(t_k) \quad (9)$$

$$P_{IST}(t_k + 1) = N\left(T_G + T_P, 2N\sigma_{Initial}^2 + \frac{t_{k+1}^2 + t_k^2}{2}\sigma_{Drift}(0)^2\right)$$

The probability of an empty slot may be given by the same condition that the difference between two consecutive start times is less than the packet transmission time.

$$P_{empty\_slot}(i, t_k) = \int_{x=0}^{x=T_P} P_{IST}(t_k) \quad (10)$$

The throughput at time t will be the ideal throughput for node I minus the throughput lost due to empty slots and the fraction of time lost due to the guard bands.

$$\text{Throughput}(i, t_k) = \frac{L(i)P_{Slot(i)}}{\sum_{i=1}^{N} L(i)P_{Slot}(i)}\left(1 - P_{empty\_slot}(i, t_K) - \frac{T_G}{T_{Slot}(avg)}\right) \quad (11)$$

In the above equation, since the packet sizes and the slots per class are same for all the nodes, the throughput will be the same for each of the nodes. Next, the effect of multiple classes is incorporated for the throughput of each node and class. (i.e., different nodes have different packet lengths and slots per class—the L(i) and the $P_{Slot}(i)$ (from equation (1)) would be different for each of the nodes). The PDF of the inter-slot-time (IST) between two consecutive slots belonging nodes i and j may be given by:

$$P_{IST}(i,j,t_k)$$

$$= P_{slot}(j)N(t_k + L(i) + T_G, \sigma_{Initial}^2) - P_{slot}(i)N(t_k, \sigma_{initial}^2) \quad (12)$$

Now any node j misses its slot is the case where the inter-schedule time is less than the packet transmission time and the guard band. Thus, the probability that node j misses its slot may be the sum over all the probabilities.

$$P_{empty\_slot}(j, t_k) = \sum_{\substack{i=1 \\ i \ne j}}^{N} \int_0^{L(i)-T_G} P_{IST}(i, j, t_k) \quad (13)$$

To examine the effect of clock drift over long periods of time, it is again assumed that the initial clock error is $N\sigma_{Initial}^2$ and the clock drift is linear in time, i.e. $\sigma_{Drift}(t) = t\sigma_{Drift}(0)$. Similar to the previous case the cumulative clock error at time t is given by:

$$P_{cumulative\_drift}(t) = N\left(t_k, N\sigma_{Initial}^2 + \frac{t_k^2}{2}\sigma_{Drift}(0)^2\right) \quad (14)$$

The above equation shows that for a particular node, the clock shows time t with normal error with mean t and the cumulative standard deviation. If the slot at time t belongs to node I and the next schedule belongs to node j, the PDF of the time difference between the start times may be given by:

$$P_{IST}(i, j, t_k) = \quad (15)$$

$$P_{slot}(j)N\left(t_k + L(i) + T_G, N\sigma_{Initial}^2 + \frac{(t_k + L(i) + T_G)^2}{2}\sigma_{Drift}(0)^2\right) -$$

$$P_{slot}(i)N\left(t_k, N\sigma_{Initial}^2 + \frac{t_k^2}{2}\sigma_{Drift}(0)^2\right)$$

The probability that node j misses its slot at time $t_k$ is given by:

$$P_{empty\_slot}(j, t_k) = \sum_{\substack{i=1 \\ i \ne j}}^{N} \int_0^{L(i)-T_G} P_{IST}(i, j, t_k) \quad (16)$$

The overall probability of empty slot at time t is the sum over the individual probabilities for each node may be:

$$P_{empty\_slot}(t_k) = \sum_{\substack{j=1 \\ i \ne j}}^{N} \sum_{\substack{i=1 \\ i \ne j}}^{N} \int_0^{L(i)-T_G} P_{IST}(i, j, t_k) \quad (17)$$

The throughput as a function of time may be given by equation 11.

In considering the problem of packet errors, packet errors may occur due to random noise with bits and the overall probability of packet errors increase with increasing packet sizes. For example, let $P_{packet\_error}$ = Packet error rate for length of unit size.

Thus, the packet error for node i assuming that FEC code rate remains the same and there are no acknowledgements for lost packets, is given by:

$$P_{success}(i) = (1 - P_{packet\_error})^{L(i)} \quad (18)$$

With the above formulation, the final equation for the throughput of any node may be given as follows:

$$\text{Throughput}(i, t_k) = \frac{(1 - P_{packet\_error})^{L(i)} L(i) P_{Slot(i)}}{\sum_{i=1}^{N} L(i) P_{Slot}(i)} \left(1 - P_{empty\_slot}(i, t_k) - \frac{T_G}{T_{Slot}(avg)}\right) \quad (19)$$

Thus, the flexibility of CSP to serve multiple classes of traffic and multiple applications extends easily to provide different levels of QoS through management of packet length or number of assigned message start time slots. Clock drift and synchronization errors reduce the throughput CSP can provide. The use of GPS to provide clock synch is one possible method to reduce clock errors.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the quality of service module 250 or it components in FIGS. 1 and 2 each processing the content in various possible ways. It does not necessarily need to be one system used by all end users. Accordingly, the appended claims and their legal equivalents should only define the disclosure, rather than any specific examples given.

We claim:

1. A method for providing quality of service in wireless or sensor networks, comprising:
   determining a class of service for transmission of one or more messages;
   adjusting a maximum packet length based on the determined class of service;
   allocating message time slots based on the determined class of service;
   setting a guard band size and frequency of resynchronization; and
   transmitting one or more messages using the adjusted maximum packet length, the allocated message time slots, and the set guard band size and frequency of resynchronization,
   the guard band size and the frequency of resynchronization being set based on at least one of the determined class of service and clock drift rate.

2. The method of claim 1, wherein the maximum packet length is adjusted so that determined classes of service having a higher priority are given higher maximum packet lengths.

3. The method of claim 1, wherein the maximum packet length is adjusted so that determined classes of service having a greater intended provision of bandwidth are given higher maximum packet lengths.

4. The method of claim 1, wherein the message time slots are allocated so that determined classes of service having a higher priority are given a higher number of time slots.

5. The method of claim 1, wherein the one or more messages are transmitted from a communication device, the communication device being one of a portable satellite radio transceiver, a Voice over Internet Protocol phone, a portable computer, a wireless telephone, a cellular telephone, a mobile telephone, and a personal digital assistant.

6. The method of claim 1, wherein the one or more messages are transmitted using a connectionless scheduling protocol.

7. An apparatus that provides quality of service in wireless or sensor networks, comprising:
   a quality of service module that determines a class of service for transmission of one or more messages, adjusts a maximum packet length based of the determined class of service, allocates message time slots based on the determined class of service, and sets a guard band size and frequency of resynchronization; and
   a transceiver that transmits one or more messages using the adjusted maximum packet length, the allocated message time slots, and the set guard band size and frequency of resynchronization,
   the guard band size and the frequency of resynchronization being set based on at least one of the determined class of service and clock drift rate.

8. The apparatus of claim 7, wherein the quality of service module adjusts the maximum packet length so that determined classes of service having a higher priority are given higher maximum packet lengths.

9. The apparatus of claim 7, wherein the quality of service module adjusts the maximum packet length so that determined classes of service having a greater intended provision of bandwidth are given higher maximum packet lengths.

10. The apparatus of claim 7, wherein the quality of service module allocates message time slots so that determined classes of service having a higher priority are given a higher number of time slots.

11. The apparatus of claim 7, wherein the transceiver transmits one or more messages from a communication device, the communication device being one of a portable satellite radio transceiver, a Voice over Internet Protocol phone, a portable computer, a wireless telephone, a cellular telephone, a mobile telephone, and a personal digital assistant.

12. The apparatus of claim 7, wherein the transceiver transmits one or more messages using a connectionless scheduling protocol.

13. A non-transitory computer readable medium that stores instructions for controlling a computing device for providing quality of service in wireless or sensor networks, the instructions comprising:
   determining a class of service for transmission of one or more messages;
   adjusting a maximum packet length based on the determined class of service;
   allocating message time slots based on the determined class of service;
   setting a guard band size and frequency of resynchronization; and
   transmitting one or more messages using the adjusted maximum packet length, the allocated message time slots, and the set guard band size and frequency of resynchronization,
   the guard band size and the frequency of resynchronization being set based on at least one of the determined class of service and clock drift rate.

14. The non-transitory computer readable medium of claim 13, wherein the maximum packet length is adjusted so that determined classes of service having a higher priority are given higher maximum packet lengths.

15. The non-transitory computer readable medium of claim 13, wherein the maximum packet length is adjusted so that determined classes of service having a greater intended provision of bandwidth are given higher maximum packet lengths.

16. The non-transitory computer readable medium of claim 13, wherein the message time slots are allocated so that determined classes of service having a higher priority are given a higher number of time slots.

17. The non-transitory computer readable medium of claim 13, wherein the one or more messages are transmitted from a communication device, the communication device being one of a portable satellite radio transceiver, a Voice over Internet Protocol phone, a portable computer, a wireless telephone, a cellular telephone, a mobile telephone, and a personal digital assistant.

* * * * *